United States Patent [19]
Walles

[11] 3,785,713
[45] Jan. 15, 1974

[54] OPTICAL DEVICE

[75] Inventor: Sten Walles, Lidingo, Sweden

[73] Assignee: AGA Aktiebolag, Lidingo, Sweden

[22] Filed: June 7, 1972

[21] Appl. No.: 260,595

[30] Foreign Application Priority Data
June 7, 1971 Sweden.............................. 7385/71

[52] U.S. Cl..................................... 350/6, 178/7.6
[51] Int. Cl. ........................................ G02b 17/00
[58] Field of Search ...................... 350/6, 7, 175 SF, 350/206; 178/7.6

[56] References Cited
UNITED STATES PATENTS
| | | | |
|---|---|---|---|
| 3,536,384 | 10/1970 | Cocks | 351/7 |
| 2,543,463 | 2/1951 | Malm | 350/6 |
| 3,563,643 | 2/1971 | Jeney | 350/6 |

OTHER PUBLICATIONS
Loffler, "Optical Compensation By Polygonal Prism," March 1961, British Kineography, Vol. 38, No. 3 pp. 61-69.

Primary Examiner—David Schonberg
Assistant Examiner—Michael J. Tokar
Attorney—Lawrence I. Lerner et al.

[57] ABSTRACT

The present invention relates to a device to generate, starting from a stationary slit, an image of this slit which scans in its transverse direction, comprising a light source arranged in such a way in front of this slit, that the principal rays through the slit are parallel to the optical axis of the device, and a straight, equilateral, transmitting polygonal cylinder located behind the slit which is arranged so as to rotate about its axis of symmetry parallel to the longitudinal direction of the slit, and a system of lenses arranged between the said polygonal cylinder and the image.

3 Claims, 2 Drawing Figures

OPTICAL DEVICE

BACKGROUND OF THE INVENTION

It is known for example from U. S. Pat. No. 2,222,937 that the image of an object can be moved or scanned in a direction at right angles to the optical axis in an image-forming optical system with the help of a transmitting polygonal cylinder limited by parallel surfaces in pairs, which is rotated in divergent or convergent ray paths about an axis parallel to the axis of symmetry of the polygonal cylinder.

It is also known for example from U. S. Pat. No. 2,868,066 that the image defect which occurs in the polygonal cylinder can be compensated by a second optical element.

It is possible by the known devices to make an image scan in an image plane at right angles to the optical axis of the system. However, the scanning image will tend to be out of focus in large parts of the image-forming plane. With the device in accordance with the invention the parts of the image plane which are out of focus will be substantially reduced.

SUMMARY OF THE INVENTION

The present invention relates to a device to generate, starting from a stationary slit, an image of this slit which scans in its transverse direction. The device includes a light source arranged in front of this slit, in a manner whereby the principal rays through the slit are parallel to the optical axis of the device; a straight, equilateral, transmitting polygonal cylinder located behind the slit which is arranged so as to rotate about its axis of symmetry parallel to the longitudinal direction of the slit, and a system of lenses arranged between the polygonal cylinder and the image. The slit is curved so that it is substantially concave to the polygonal cylinder and the system of lenses is arranged to compensate the image defect generated by the polygonal cylinder. Thus the image is imaged sharply within a widened area in an image plane perpendicular to the optical axis of the device.

Preferably, the system of lenses consists of rotationally symmetrical lenses. The slit is curved with a radius of curvature such that:

$$0.06 \ (n \ N \ L)/(n-1) < r < 0.45 \ (n \ N \ L)/(n-1)$$

where $n$ is the refractive index and $N$ is the number of pairs of mutually parallel surfaces on the polygonal cylinder and $L$ is the total length of scanning.

DETAILED DESCRIPTION OF THE DRAWINGS

Figure 1:
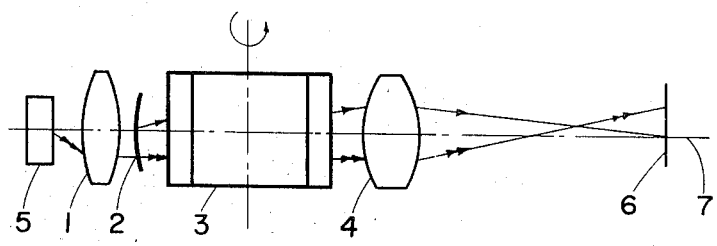
Figure 2:
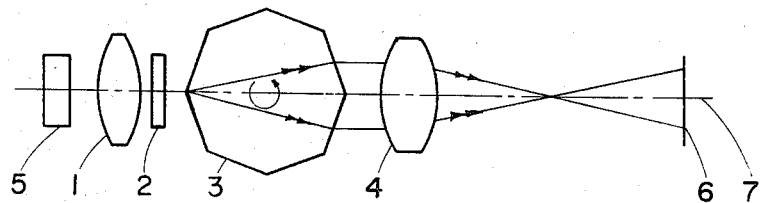

The device in accordance with the invention will be described in detail with the help of the enclosed drawing, in which FIG. 1 and FIG. 2 show two mutually orthogonal views of the device in accordance with the invention.

In the drawing, a light source is designated by numeral 5. By means of a lens 1, the principal rays in the light emitted by the light source 5 are aligned parallel to the optical axis 7 of the system. Behind the lens is situated a straight, equilateral, transmitting polygonal cylinder 3. This polygonal cylinder is arranged so as to rotate about its axis of symmetry. Between the lens 1 and the cylinder 3 is located a slit 2, the longitudinal direction of which is parallel to the axis of symmetry of the cylinder 3. Behind the cylinder 3 is situated a system of lenses 4 for focusing the image of the slit 2 onto an image plane 6 perpendicular to the optical axis 7.

By rotation of the polygonal cylinder 3 a scanning of the slit in the image plane is achieved. The slit is directed so that the scanning is accomplished in the transverse direction of the slit.

The polygonal cylinder 3 shown on the drawing has eight sides of equal size. It is also possible, however, to use polygonal cylinders of a greater or smaller number of sides, constructed so that the sides are parallel in pairs.

The lens 1 ensures that the entrance pupil of the system is at infinity, so that the pupillary image (that is to say the plane which contains the point of intersection of the principal rays with the optical axis) behind the lens system 4 becomes stigmatic. The need for this becomes apparent if FIGS. 1 and 2 are compared. It can be seen that the principal rays marked by double arrows in FIG. 2, directly after the polygonal cylinder 3 have become parallel to the optical axis 7 through the effect of this cylinder. In the section shown in FIG. 1, the polygonal cylinder 3 exerts no such effect, wherefore the lens 1 has to be introduced so as to make the principal rays marked by double arrows in FIG. 1 parallel to the optical axis directly after the polygonal cylinder 3 also in this view.

The image defect of the polygonal cylinder 3 does not vary in a rotationally symmetrical manner in relation to the optical axis 7. To compensate nevertheless the image defect of the polygonal cylinder 3 with the help of the system of lenses 4, which consists of rotationally symmetrical lenses, this relationship is utilized in accordance with the invention so as to obtain good sharpness of image formation within a widened area of the image plane 6. This is achieved in that on the one hand opposite image defects are introduced among the rotationally symmetrical lenses in the lens system 4 and on the other hand in that the slit 2 is curved so that its surface is imagined to be situated on a cylinder surface which is concave to the polygonal cylinder 3, the generatrices of which surface are perpendicular to the optical axis and to the axis of symmetry of the polygonal cylinder, and that the slit 2 is symmetrical about the optical axis. By virtue of this, sharpness is achieved in the image plane substantially over the shole slit in all slit image positions, subject to the scanning length not exceeding the length of the slit.

The image defect situation can be described substantially in terms of Seidel's aberration analysis as follows:

The spherical aberration of the polygonal cylinder 3 and its coma in the transverse direction of the slit 2 can be compensated by the rotationally symmetrical lenses in the lens system 4. Furthermore, the polygonal cylinder 3 during its rotation introduces a considerably tangential field curvature, which for good sharpness of image formation has to be compensated in each slit position at the center of the slit 2 in the transverse direction of the slit, in that opposite tangential field curvature is introduced among the rotationally symmetrical lenses of the lens system 4. Since the polygonal cylinder 3 introduces relatively small field curvature in the longitudinal direction of the slit 2, good sharpness of image formation is obtained in the transverse direction of the slit for all points along the slit 2 when its image is in center position (neutral scanning position), if the slit 2 is curve concave to the polygonal cylinder 3 to such a degree that it follows the sagittal field curvature among the rotationally symmetrical lenses in the lens system 4.

On the basis of a well-known relationship between the tangential and sagittal field curvature of the lenses and their Petzval curvature the radius of curvature $r$ of the slit 2 is determined indirectly by the radius of curvature of the tangential image shell arising at the rotation of the polygonal cylinder 3, so that it is appropriately situated in the interval $$0.06 \, (n \, N \, L)/(n-1) < r < 0.45 \, (n \, N \, L)/(n-1)$$

where $n$ is the refractive index and N is the number of mutually parallel surfaces on the polygonal cylinder 3 and L is the total length of scanning.

It is particularly appropriate if r is chosen so that $$0.10 \, (n \, N \, L)/(n-1) < r < 0.28 \, (n \, N \, L)/(n-1)$$

To sum up, it can be said that the invention consists in allowing the constructor to achieve a good quality of image in the transverse direction of the scanning slit images in the image plane 6 by compensation of the spherical aberration, coma and tangential field curvature of the polygonal cylinder 3 by the system of lenses 4, and by arranging the shape of the slit 2 in file depth in such a manner that the slit 2 is made concave to the polygonal cylinder 3, so that the sharpness of image formation of the slit 2 is optimized.

It will be appreciated that the present description has been by way of example only and is not intended as a limitation to the scope of the invention as defined in the appended claims.

I claim as my invention:

1. A device to generate, starting from a stationary slit, an image of this slit which image scans in its transverse direction, comprising a slit, a light source arranged in front of said slit so that the principal rays through the slit are parallel to the optional axis of the device, a straight, equilateral, transmitting polygonal cylinder located behind said slit which is arranged so as to rotate about its axis of symmetry parallel to the longitudinal direction of said slit, and a system of lenses arranged between the said polygonal cylinder and image, said slit being curved with a radius of curvature such that:

$$0.06 \, (n \, N \, L)/(n-1) < r < 0.45 \, (n \, N \, L)/(n-1)$$

wherein $n$ is the refractive index and N is the number of pairs of mutually parallel surfaces on the polygonal cylinder and L is the total length of scanning, so that it is substantially concave to the polygonal cylinder, said system of lenses being arranged to compensate for image defects generated by the polygonal cylinder, whereby the image is imaged sharply within a widened area in an image plane perpendicular to the optical axis of the device.

2. A device in accordance with claim 1, wherein said system of lenses consists of rotationally symmetrical lenses.

3. A device in accordance with claim 1, wherein said slit radius of curvature is such that:

$$0.10 \, (n \, N \, L)/(n-1) < r < 0.28 \, (n \, N \, L)/(n-1)$$

* * * * *

UNITED STATES PATENT OFFICE
CERTIFICATE OF CORRECTION

Patent No. 3,785,713    Dated January 15, 1974

Inventor(s) Sten Walles

It is certified that error appears in the above-identified patent and that said Letters Patent are hereby corrected as shown below:

Column 4, line 6, "optional" should read -- optical --.

Signed and sealed this 24th day of September 1974.

(SEAL)
Attest:

McCOY M. GIBSON JR.
Attesting Officer

C. MARSHALL
Commissioner of Patents